(12) United States Patent
Kanno et al.

(10) Patent No.: US 6,597,647 B2
(45) Date of Patent: Jul. 22, 2003

(54) OPTICAL RECORDING MEDIUM HAVING INDIVIDUAL DRIVE CONTROL INFORMATION RECORDED IN THE MAKER RECORDING AREA

(75) Inventors: Masayoshi Kanno, Tokyo (JP); Masatsugu Suwabe, Miyagi (JP)

(73) Assignee: Sony Corporation, Tokyo (JP)

( * ) Notice: Subject to any disclaimer, the term of this patent is extended or adjusted under 35 U.S.C. 154(b) by 119 days.

(21) Appl. No.: 09/822,068

(22) Filed: Mar. 30, 2001

(65) Prior Publication Data
US 2002/0012301 A1 Jan. 31, 2002

(30) Foreign Application Priority Data
Mar. 31, 2000 (JP) ........................................ 2000-098902

(51) Int. Cl.[7] ................................................ G11B 5/09
(52) U.S. Cl. ................................ 369/47.51; 369/53.26; 369/275.3
(58) Field of Search ............................... 369/47.49, 47.5, 369/47.51, 47.52, 47.55, 53.12, 53.13, 53.26, 53.27, 53.37, 116, 275.3

(56) References Cited
U.S. PATENT DOCUMENTS 5,544,137 A * 8/1996 Ohara et al. ................ 369/116
6,324,128 B1 * 11/2001 Ikeda et al. ................ 369/53.2

* cited by examiner

Primary Examiner—Paul W. Huber
(74) Attorney, Agent, or Firm—Sonnenschein, Nath & Rosenthal

(57) ABSTRACT

To stably perform optical recording and optical reproducing under optimum conditions, in an optical recording medium having a writable recording layer on a substrate and having a maker recording area in which recording is performed by a maker on the recording layer, individual drive control information of the optical recording medium is recorded in the maker recording area, and, in optical recording and optical reproducing, optical recording and optical reproducing are performed by the drive control information under optimum conditions.

17 Claims, 4 Drawing Sheets

OPTICAL RECORDING MEDIUM HAVING INDIVIDUAL DRIVE CONTROL INFORMATION RECORDED IN THE MAKER RECORDING AREA

RELATED APPLICATION DATA

The present application claims priority to Japanese Application No. P2000-098902 filed Mar. 31, 2000, which application is incorporated herein by reference to the extent permitted by law.

BACKGROUND OF THE INVENTION

The present invention relates to an optical recording medium having a writable recording layer having a maker recording area on an optical recording medium substrate, an optical recording method, an optical reproducing method, and an optical recording/reproducing device therefor.

In an optical medium such as an optical disk represented by, e.g., a mini disk (MD), for example, a so-called WO (Write Once) type optical recording medium on which data can be recorded once or a so-called RW (Rewritable) type optical recording medium on which data is rewritable, on a substrate molded by, e.g., an injection mold, in the molding, in a predetermined region of the substrate, a so-called premastered area in which information of a design center value of an illumination light power at, e.g., a standard temperature, i.e., a standard value, in optical recording or/and optical reproducing of the optical recording medium is written by pits or wobbled grooves is formed.

In this manner, in optical recording or/and optical reproducing of the optical recording medium, the information in the premastered area described above is loaded on a drive device for the optical recording medium, optical recording or/and optical reproducing is performed by using a value corrected by a set temperature as an optimum power. For this reason, a difference between the sensitivities of optical recording media of different makers is corrected.

However, in recent years, with a demand for a high recording density in an optical recording medium, margins (allowances) of characteristics required for the optical recording medium tend to be narrow. For this reason, in manufacturing an optical recording medium, it is required that the variation of characteristics caused by the manufacturing should be sufficiently close to a standard value given by the premastered.

As a concrete example of this variation, for example, recording power sensitivities will be exemplified. A variation of sensitivities of an outer peripheral portion and an inner peripheral portion of a disk-like optical recording medium in the radial direction, a variation of optical recording media in a manufacturing lot, and a variation of manufacturing lots are known. Of these variations, in sputtering in a film forming process of, e.g., a recording layer, a variation in a lot caused by a change in composition or the like of sputtering sources caused by continuation of sputtering or a variation caused by the passage of time such as a variation of lots is attempted to be reduced as largely as possible such that aging is monitored in manufacturing the recording layers, and the information is fed back for manufacturing conditions and state selection.

However, for example, a variation of disks, e.g., a variation of recording power sensitivities in the inner and outer peripheries or the like cannot be attempted to be sufficiently reduced in the manufacturing processes. For this reason, under the present circumstances, a variation caused by manufacturing cannot be easily suppressed within a small margin.

Therefore, in manufacturing an optical recording medium with a conventional configuration, when a finally obtained optical recording medium falls without a correction range obtained by information written in the premastered area, a method for wasting the optical recording medium and remanufacturing a optical recording medium is employed.

However, in such a method, as described above, when a margin is narrowed with an increase in density, the amount of waste increases. Therefore, due to a decrease in yield and a high cost, but also concerns about saving resources, environmental problems, energy saving, or the like, waste or remanufacturing is posed as a serious problem.

SUMMARY OF THE INVENTION

The present invention is to provide an optical recording medium, an optical recording method, an optical reproducing method, and an optical recording/reproducing device which attempt to solve these problems, i.e., which can increase a yield and which can stably perform optical recording and optical reproducing under optimum conditions.

More specifically, an optical recording medium according to the present invention has a writable recording layer on a substrate and has a maker recording area on which a maker performs recording on the recording layer, and individual drive control information of the optical recording medium is recorded in the maker recording area.

More specifically, in the present invention, not only a serial number or a normal maker code, but also optimum drive control information are recorded in the maker recording area.

The drive control information is an individual variation in optical recording media, for example, all or part of respective information on a recording sensitivity, a reproducing sensitivity, temperature dependency of a recording sensitivity, temperature dependency of a reproducing sensitivity, linear speed dependency of a recording sensitivity, linear speed dependency of a reproducing sensitivity, recording magnetic field sensitivity, reproducing magnetic field sensitivity, an optimum resolution, optimum asymmetry a change in sensitivity caused by repetitive recording, and a change in sensitivity caused by repetitive reproducing.

According to the present invention, in an optical recording method for an optical recording medium having a writable recording layer on a substrate and having a maker recording area and a user recording area formed on the recording layer, individual drive control information of the optical recording medium is recorded in the maker recording area, and the optical recording method comprises the steps of controlling a drive circuit based on the drive control information and performing optical recording in the user area by the drive circuit.

According to the present invention, in an optical reproducing method for an optical recording medium having a writable recording layer on a substrate and having a maker recording area and a user recording area formed on the recording layer, individual drive control information of the optical recording medium is recorded in the maker recording area, and the optical reproducing method comprises the steps of controlling a drive circuit on the basis of the drive control information and performing optical reproducing from the user area by the drive circuit.

In addition, according to the present invention, an optical recording/reproducing device for an optical recording medium having, on a substrate, a premastered recording area written by a pattern obtained by molding when the substrate is molded, and having a writable recording layer on the substrate, a maker recording area and a user recording area being formed on the recording layer, using an optical recording medium in which individual drive control information of the optical recording medium is recorded in the maker recording area, includes a recording/reproducing laser, an automatic power control circuit of the laser, an emission power monitor for the laser, a premastered signal detection unit for detecting a premastered signal in the premastered area of the optical recording medium, a maker signal detection signal for detecting a maker recording signal of the maker recording area, a temperature sensor, a control circuit, and an error detection unit, and a memory.

By the control circuit, the error detection unit, and the memory, on the basis of error-free signals of the premastered signal and the maker recording signal, a correction value to a standard value is obtained, a control signal subjected to temperature correction on the basis of temperature information obtained from the temperature sensor is obtained, the control signal and a monitor signal obtained by the emission power monitor of the laser are guided to the automatic power control circuit, and optical recording and optical reproducing to the optical recording medium are performed while the emission power of the laser is automatically controlled by the automatic power control circuit.

As described above, according to the present invention, not only information recorded based on a standard value serving as, e.g., a design center, determined when the substrate of the optical recording medium is molded, i.e., but also the individual information of the optical recording medium, i.e., information based on a variation of optical recording media are recorded in the maker recording area, so that optical recording and optical reproducing can be performed on the basis of the information. For this reason, when the respective optical recording media are shifted from the standard value recorded in the premastered by a regulation or more, on the basis of the information recorded in the maker recording area, excellent optical recording or reproducing can be performed.

Incidentally, in a conventional optical recording medium, in a recording area only for a maker, only a maker code, a serial number, and the like are described, and any recording related to drive control information in recording and reproducing is not performed.

DESCRIPTION OF THE PREFERRED EMBODIMENTS

An optical recording medium according to the present invention will be described first.

Figure 1:
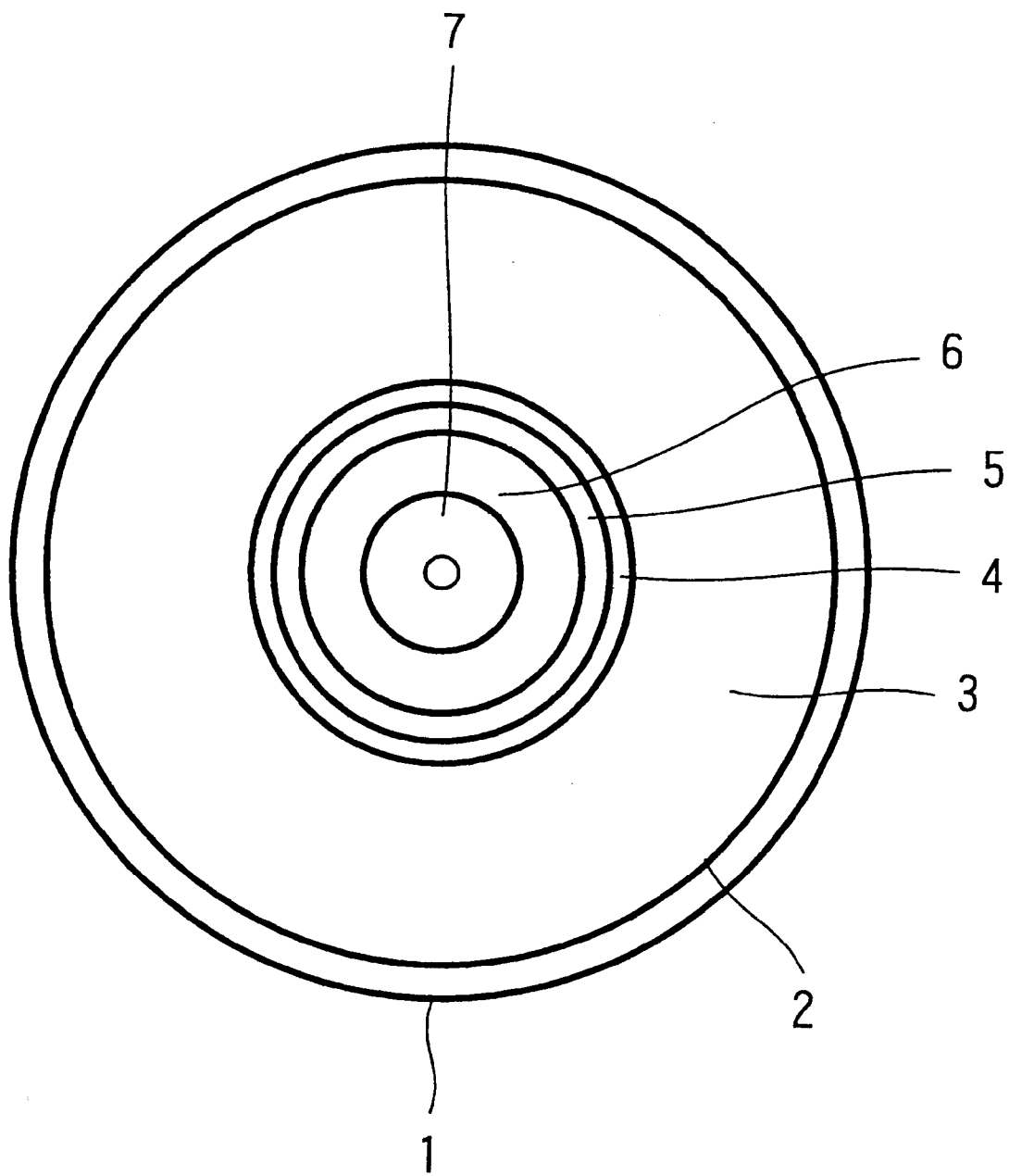
FIG. 1 is a schematic plan view of an example of an optical recording medium according to the present invention.

FIG. 1 shows a schematic plan view of an example of an embodiment of a disk-type optical recording medium, e.g., a mini disk (MD) according to the present invention. However, the optical recording medium according to the present invention is not limited to a disk-type optical recording medium, as a matter of course.

In this embodiment, a writable recording layer 2 is formed on a substrate 1 formed by injection molding obtained by, e.g., polycarbonate (PC).

This recording layer 2 has a user recording area 3 on which recording is performed by a user. In an optical recording medium in which recording and reproducing to the recording area 3 are performed from the inner peripheral side, a maker recording area 4 on which a maker performs recording is formed on the inner peripheral side of the recording area 3.

In addition, as described above, in an optical recording medium in which recording and reproducing are performed from the inner peripheral side, a premastered area 5 in which information obtained by pits or wobbling or the like molded, i.e., written when the substrate 1 is molded is formed on the inner peripheral side of the maker recording area 4.

On the premastered area 5, in general, as in an optical recording medium of this type, e.g., a recording laser beam power selected by a maker, a design center value of a reproducing laser beam power, i.e., standard value information are recorded.

On the central side of the premastered area 5, a magnetic metal plate 7 is mounted on the central side through an inner peripheral invalid area 6. The magnetic metal plate 7 is magnetically absorbed on a disk loading unit of a drive device, so that the optical recording medium is loaded into the drive device.

In the optical recording medium according to the present invention, individual drive control information of the optical recording medium is recorded in the maker recording area 4.

For example, in the optical recording medium, the sensitivity information of the optical recording medium in which a sensitivity characteristic is shifted from, e.g., a sensitivity standard value written in the premastered area 5 of the substrate 1 by a standard margin or more is recorded in the maker recording area 4.

When a variation of sensitivities of the inner periphery and the outer periphery of the user recording area 3 is generated, information related to the variation is recorded.

The recording information to the maker recording area 4 is paired with the information of the premastered area 5, i.e., cooperates with the information of the premastered area 5 to obtain desired information, so that the number of bits of the information to the maker recording area 4 can be reduced.

More specifically, for example, with respect to the sensitivity information described above, in the maker recording area 4, the sensitivity, the optimum recording power or a reproducing power is not recorded as an absolute numeral value. The information of the difference between the sensitivity and the standard value of the premastered area 5 written in the substrate 1 is recorded in the maker recording area 4, so that the number of bits of the information related to the sensitivity to the maker recording area 4 can be reduced.

As the information recording to the maker recording area 4, the same information can be repeatedly recorded on a plurality of portions in the maker recording area 4.

In this configuration; in recording and reproducing on/from the optical recording medium, by reading the pieces of same information, it is decided whether the information is erroneous information or not, i.e., the pieces of information include pieces of erroneous information generated by recording errors or the like. When the pieces of information include erroneous information, the next best method of operating the drive device by information written in the premastered area 5 can be employed.

As the drive control information recorded in the maker recording area 4, information related to the portions of the user recording area 3 of the optical recording medium can be used.

For example, when a disk-type optical recording medium is used, pieces of information of n zones, e.g., several ten zones in the radial direction of the disk-recording medium can be recorded. In this case, as described above, a difference between the pieces of information and the standard value written in the premastered area 5 is recorded.

For example, with respect to a reproducing sensitivity and a recording sensitivity, i.e., the power of a reproducing laser beam and the power of a recording laser beam, as illustrated in Table 1, when the standard values written in the premastered area 5 are 1.0 mW and 8.0 mW, as pieces of information related to zones 1 to n, the information of the differences between the pieces of the information and the standard values are written.

TABLE 1

| Sensitivity Information of Zones | | | | |
|---|---|---|---|---|
|  | Standard value | Zone 1 | Zone 2 | Zone n |
| Reproducing Sensitivity (mW) | 1.0 | −0.02 | 0.00 | +0.08 |
| Recording Sensitivity (mW) | 8.0 | −0.20 | −0.10 | +0.40 |

The pieces of information related to the zones 1 to n can be obtained by measuring the characteristics of the zones related to a plurality of optical recording media randomly sampled from, e.g., the same manufacturing lot to calculate average values of the respective zones.

In an optical recording medium such as an MD, the temperature dependency of a recording sensitivity is regulated, and reproducing characteristic is sensitive to a temperature as in a super-resolution optical recording medium. For this reason, in these optical recording media, changes in sensitivity caused by a recording temperature and a reproducing temperature must be also regulated.

This super-resolution optical recording medium, in reading information from the optical recording medium, uses a temperature distribution in an irradiated reproducing laser beam spot. With respect to, limitedly, a region having a desired temperature in the spot, recording information (i.e., magnetization) is transferred from a memory layer to a reproducing layer in a recording layer, parts of information bits of a plurality of information bits in the optical spot are selectively read, or the temperature distribution in the spot of a similar reproduced laser beam makes it possible to erase parts of the information bits and to reproduce only parts of the information bits, so that information bits each having a size equal to or smaller than the optical spot can be read. A resolution which is equal to or lower than an optical limit can be realized. Therefore, in the optical recording medium, the reproducing characteristic is sensitive to a temperature.

As an example of drive control information to these optical recording media, for example, a record of pieces of information of a recording sensitivity, a reproducing sensitivity, temperature dependency of a recording sensitivity, temperature dependency of a reproducing sensitivity, linear speed dependency of a recording sensitivity, linear speed dependency of a reproducing sensitivity, and the like is known. Also, for example, a record of a recording magnetic field sensitivity in case of the magnetic field modulation recording and a record of information of a reproducing magnetic field sensitivity when an external magnetic field is applied in reproducing are known. In addition, for example, an optimum resolution, i.e., for example, information for selecting an optimum reproducing power in consideration of an amplitude ratio depending on the lengths of recording marks to perform optimum reproducing to the super-resolution optical recording medium described above, optimum asymmetry, i.e., for example, asymmetry detection value information for performing optical modulation recording, a change in sensitivity of a recording medium caused by repetitive recording or reproducing, more specifically, a record of the number of times of recording and reproducing for each recording or reproducing, information of the relationship between the number of times and the change in sensitivity, and the like can be given.

Table 2 illustrates reproducing sensitivities when the number of times of repetitive recording are 10, 100, 1000, and 10000, and changes in recording sensitivities.

TABLE 2

| Change in Sensitivity Caused by Repetitive Recording | | | | |
|---|---|---|---|---|
| The Number of Times of Recording | 10 | 100 | 1000 | 10000 |
| Reproducing Sensitivity (mW) | 0.00 | 0.00 | +0.02 | +0.05 |
| Recording Sensitivity (mW) | 0.00 | 0.00 | −0.05 | −0.15 |

In an area in which the number of times of repetitive recording increases, a sensitivity shift depending on the number of times of usage is accurately estimated, so that the error of an optimum recording power can be decreased. When this value is given to each zone, the error can be further decreased.

An embodiment of an optical recording and/or optical reproducing (to be referred to as recording, reproducing hereinafter) method according to the present invention will be described below.

In the recording, reproducing method according to the present invention, an optical recording medium according to the present invention described above, e.g., an MD will be used.

Figure 2:
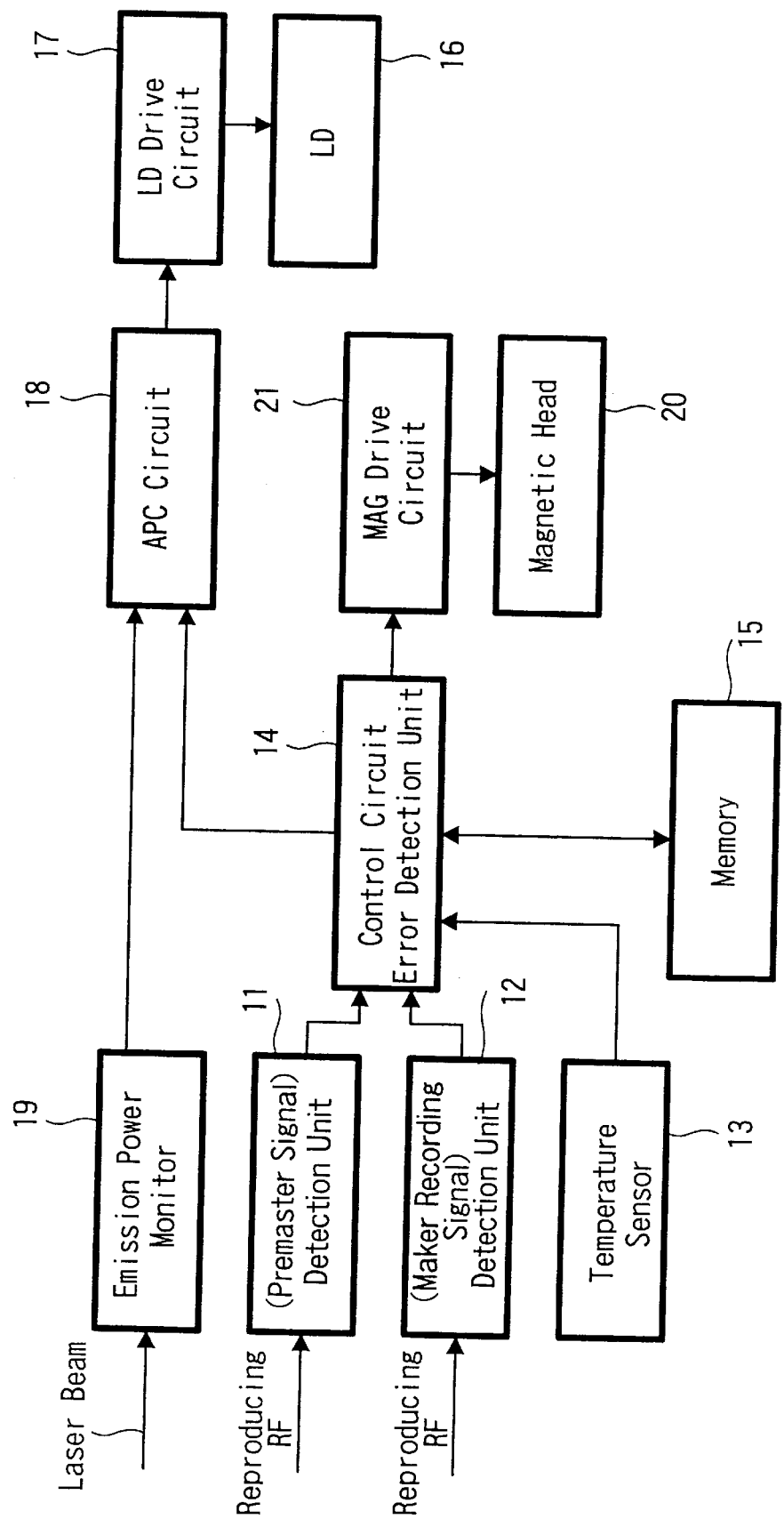
FIG. 2 is a block diagram of signal processing of optical recording and optical reproducing of an example of an optical recording/reproducing device according to the present invention.

An outline of an example of the recording, reproducing method according to the present invention will be described with reference to an optical recording/reproducing device according to the present invention shown in FIG. 2, i.e., a block diagram of signal processing related to a drive device and a flow chart of signal processing in FIG. 3.

Figure 3:
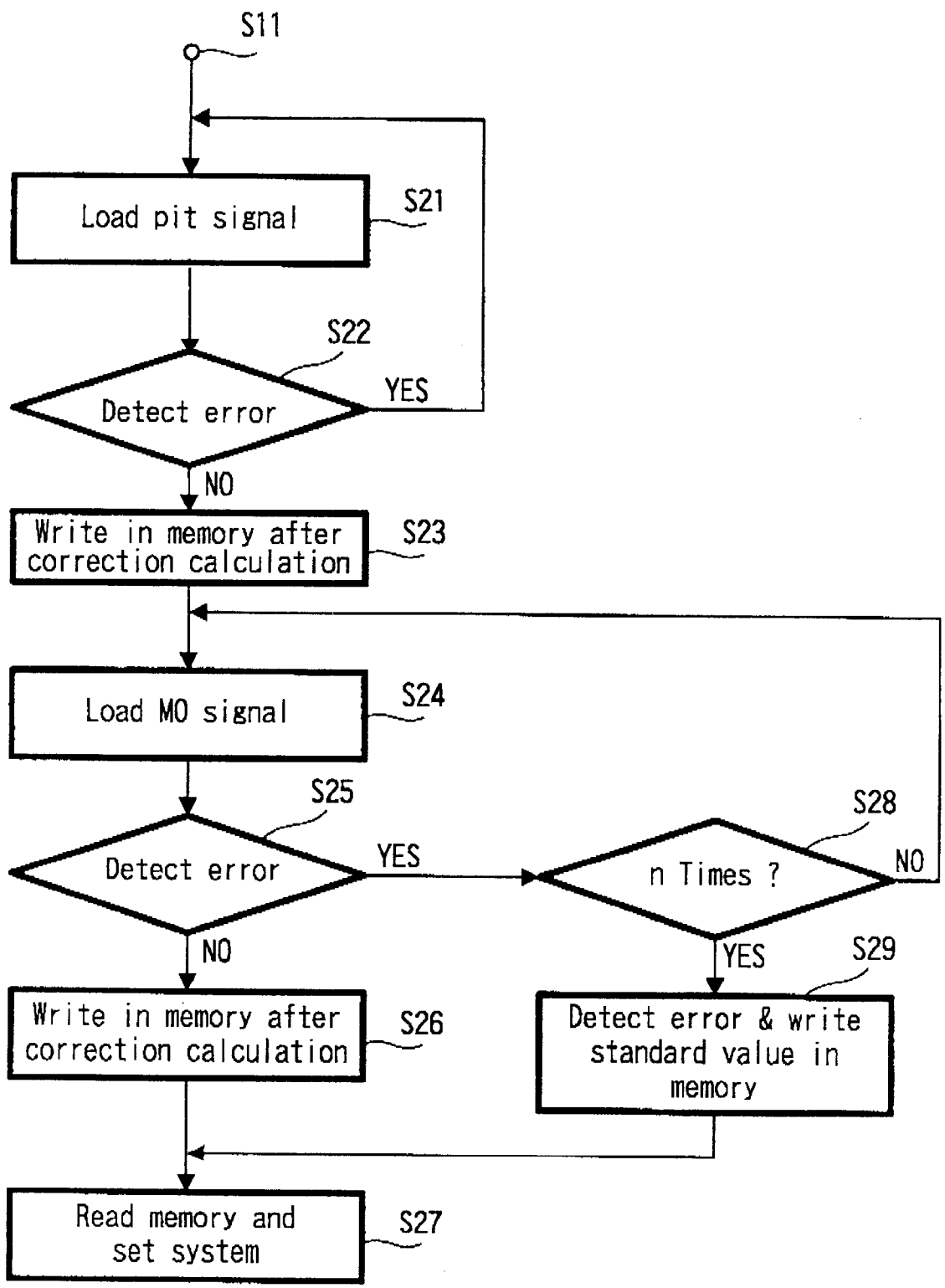
FIG. 3 is a flow chart of optical recording and optical reproducing according to the present invention.

In this example, the drive device, as shown in FIG. 3, includes a premastered signal (pit signal) detection unit 11 for detecting a reproducing RF (high-frequency) obtained by reproducing information written as, e.g., pits in the premastered area 5 of the optical recording medium, a maker recording signal detection unit, e.g., a magneto-optical (MO) signal detection unit 12 recorded in the maker recording area 4, a temperature sensor 13, a control circuit and an error detection unit 14, a memory 15, a semiconductor laser (LD) 16, for example, for generating a laser beam for performing recording and reproducing to an optical recording medium, a LD drive circuit 17 for driving the semiconductor laser (LD) 16, an automatic power control circuit (APC) circuit 18 for controlling the LD drive circuit 17 to control the power of laser emission, an emission power monitor 19 for detecting a laser beam from the semiconductor laser (LD) 16 to detect the emission power, a magnetic head 20 serving as a magnetic field application means when magnetic field application is performed in at least one of recording and reproducing to the optical recording medium, and a drive circuit 21 for the magnetic head 20.

As shown in FIG. 3, when recording or reproducing of the optical recording medium is started, standard value information detected by the premastered signal (pit signal) detection unit 11 is loaded on the control circuit and the error detection unit 14 (step S21 in FIG. 3), so that error detection is performed (step S22). If it is determined that the value includes an error, the pit signal is loaded again. If it is determined that the value does not include an error, standard value memory writing, i.e., storage is performed to the memory 15 (step S23).

Thereafter, the information of the maker recording area 4 from the MO signal detection unit 12 is loaded on the control circuit and the error detection unit 14 (step S24), so that error detection is performed (step S25).

If it is determined that the value does not include an error, a correction value obtained from individual information obtained by the MO signal and standard value information obtained by the pit signal are written in the memory 15 (step S26). The information stored in the memory 15 is picked out, and signal supply to the automatic power control circuit (APC) circuit 18 of the semiconductor laser (LD) 16 is performed by the control unit 14. On the other hand, the signal is compared with a signal from the emission power monitor 19, and the laser drive circuit 17 is controlled to perform emission power control of the laser 16. At the same time, a control signal is supplied to the drive circuit 21 of the magnetic head 20 to perform intensity control of a magnetic field from the magnetic head 20 (step S27).

In step S25, if it is determined that the value includes an error, the MO signal is loaded again (step S28). When the value still has an error after the loading is performed a predetermined number of times (n times), the loading is stopped. The generation of the error and the standard value loaded in advance are written as a correction value in the memory 15 (step S29). On the basis of the correction value, the step S27 described above is performed.

An ambient temperature is always monitored by the temperature sensor 13. On the basis of the result and information of a temperature coefficient loaded by the bit signal detection unit 11 and the MO signal detection unit 12, recording, reproducing laser powers are controlled such that the laser powers are successively optimum.

Figure 4:
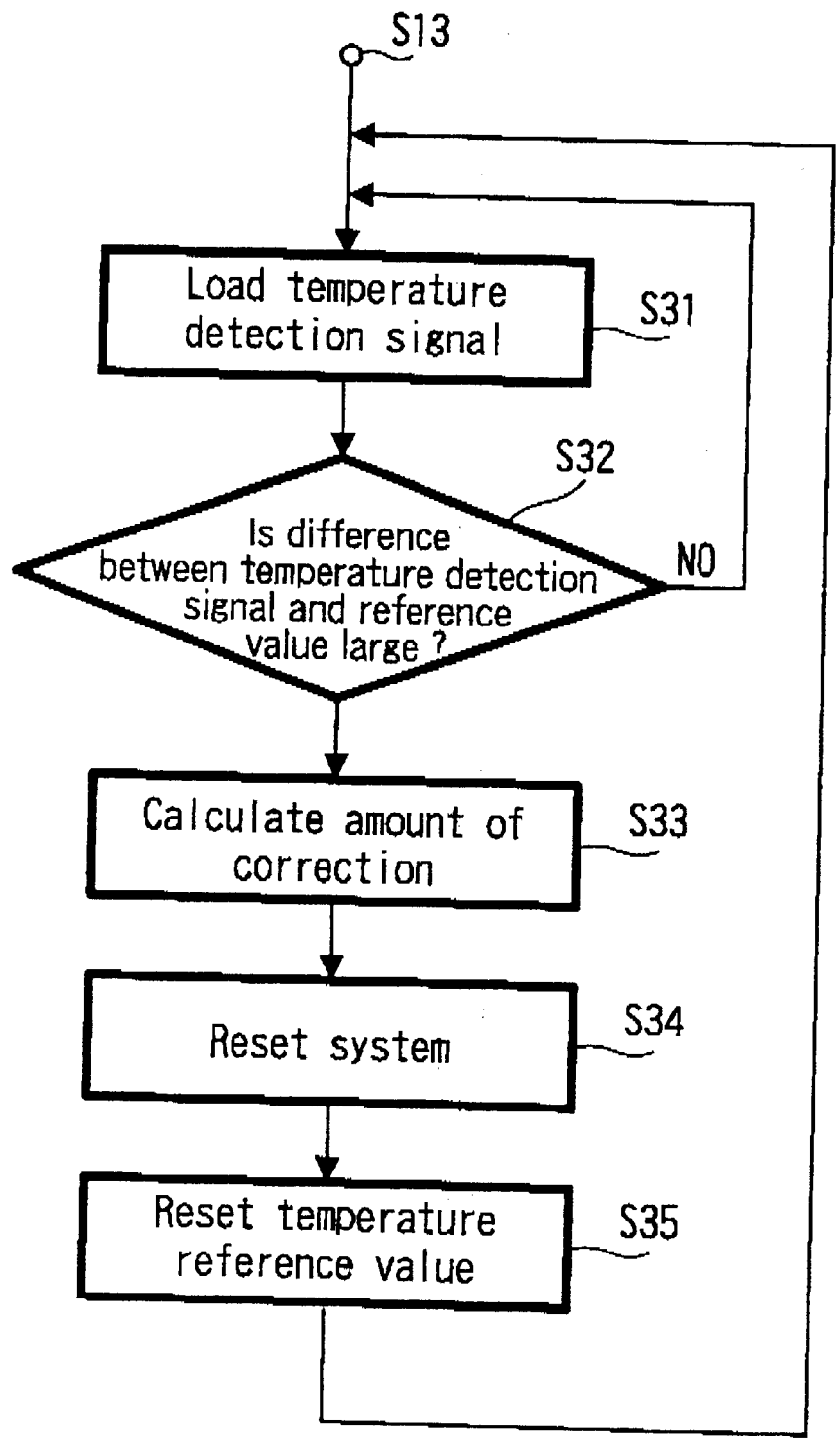
FIG. 4 is a flow chart of temperature control of optical recording and optical reproducing according to the present invention.

FIG. 4 shows a flow chart of the temperature control.

In this case, a temperature standard (reference) value loaded from the premastered area 5 and a signal detected by the temperature sensor 13 are loaded on the control circuit, error detection unit 14 (step S31). It is checked whether the difference between the detected temperature and the reference value exceeds a certain value or not (step S32). If the difference exceeds the certain value, an amount of correction is calculated from a temperature difference between the detected temperature and the loaded temperature coefficient (step S33), resetting the recording/reproducing device, i.e., system resetting is performed (step S34).

Thereafter, the temperature used at this time is written in the memory 15 as a new temperature reference value. More specifically, temperature reference value resetting is performed (step S34). Subsequently, the difference between the detected temperature and the temperature reference is successively monitored to perform the same processes as described above.

On the other hand, in step S32, if the difference between the detected value and the reference value is small, e.g., falls within an allowable range, the temperature monitoring is successively performed without performing resetting or the like.

When recording and reproducing according to the present invention are performed by using the optical recording medium according to the present invention, optimum recording and reproducing or almost optimum recording and reproducing can be performed.

More specifically, according to the present invention, since drive control information is recorded on a maker recording area, a finally manufactured optical recording medium is shifted from a standard value or a center value of a premastered area written in a substrate 1 constituting the optical recording medium when the substrate 1 is molded by a standard margin, the operation conditions of the drive device are corrected in the recording and reproducing, so that optimum recording and reproducing or almost optimum recording and reproducing can be performed.

The present invention can be applied to not only the disk-type optical recording medium, but also optical recording media having various shapes and forms.

As described above, according to an optical recording medium configuration according to the present invention and an optical recording and/or optical reproducing method according to the present invention using the optical recording medium configuration, individual drive control information related to the optical recording medium is recorded in the maker recording area. For this reason, a finally manufactured optical recording medium can widen an allowable range of a variation of the premastered area written in a substrate constituting the optical recording medium when the substrate is molded, from a standard value or a center value. Optimum or almost optimum recording and reproducing can be performed to each optical recording medium, and stable recording and reproducing can be performed to each optical recording medium.

An optical recording medium which is understood to be shifted from a standard margin and which is wasted as a defective optical recording medium can be used as a good product, i.e., merchandise by substantially widening an allowable range so that a rate of good products can be increased. An increase in yield and a reduction in cost can be achieved.

In addition, the reduction in waste achieves improvements in resource saving, environmental problems, and energy saving.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An optical recording medium having a writable recording layer on a substrate, comprising:
    a maker recording area on the recording layer;
    a premastered area in which information is written when the substrate is formed;

wherein individual drive control information of the optical recording medium is recorded in the maker recording area; and wherein drive control information for recording to the maker recording area is paired with said information of the premastered area to determine any differences, such that a number of bits related to said drive control information recorded to the maker recording area can be reduced.

2. The optical recording medium according to claim 1, wherein the drive control information is at least part of respective information on recording sensitivity, reproducing sensitivity, temperature dependency of recording sensitivity, temperature dependency of reproducing sensitivity, linear speed dependency of recording sensitivity, linear speed dependency of reproducing sensitivity, recording magnetic field sensitivity, reproducing magnetic field sensitivity, an optimum resolution, optimum asymmetry, a change in sensitivity caused by repetitive recording, and a change in sensitivity caused by repetitive reproducing.

3. The optical recording medium according to claim 1, wherein the premastered area is written by a pattern obtained by molding when the substrate of the optical recording medium is molded.

4. The optical recording medium according to claim 1, wherein said individual drive control information is recorded in a plurality of different portions in the maker recording area, and said same drive control information in said plurality of different portions is read to determine whether said drive control information includes erroneous information, and when said drive control information includes erroneous information, said information written in said premastered area is employed.

5. An optical recording method for an optical recording medium, having a writable recording layer on a substrate and comprising a maker recording area, a premastered area in which information is written when the substrate is formed, and a user recording area formed on the recording layer, wherein individual drive control information of the optical recording medium is recorded in the maker recording area, the optical recording method comprising:

controlling a drive circuit based on the drive control information recorded in the maker recording area, wherein said drive control information for recording to the maker recording area is paired with said information of the premastered area to determine any differences, such that a number of bits related to said drive control information recorded to the maker recording area can be reduced; and performing optical recording in the user area by the drive circuit.

6. The optical recording method according to claim 5, wherein the drive control information is at least part of respective information on recording sensitivity, reproducing sensitivity, temperature dependency of recording sensitivity, temperature dependency of reproducing sensitivity, linear speed dependency of recording sensitivity, linear speed dependency of reproducing sensitivity, recording magnetic field sensitivity, reproducing magnetic field sensitivity, an optimum resolution, optimum asymmetry, a change in sensitivity caused by repetitive recording, and a change in sensitivity caused by repetitive reproducing.

7. The optical recording method according to claim 5, further comprising:

judging whether or not information is erroneous based on a required number of drive control information written in the plurality of portions; and wherein the optical recording step of performing an optical recording on the user area of the optical recording medium is based on the drive control information from which erroneous information is eliminated based on the judgement.

8. An optical recording method for an optical recording medium having a writable recording layer on a substrate and having a maker recording area and a user recording area formed on the recording layer, wherein individual drive control information of the optical recording medium is recorded in the maker recording area, the optical recording method comprising:

controlling a drive circuit based on the drive control information, and performing optical recording in the user area by the drive circuit;

wherein the same drive control information is written in a plurality of portions of the maker recording area, and further comprising:

judging whether or not information is erroneous based on a required number of the drive control information written in the plurality of portions, and wherein the optical recording step of performing an optical recording on the user area of the optical recording medium is based on the drive control information from which erroneous information is eliminated based on the judgement.

9. An optical reproducing method for an optical recording medium having a writable recording layer on a substrate and having a maker recording area, a premastered area in which information is written when the substrate is formed, and a user recording area formed on the recording layer, wherein individual drive control information of the optical recording medium is recorded in the maker recording area, the optical reproducing method comprising:

controlling a drive circuit on the basis of the drive control information recorded in the maker recording area, wherein said drive control information for recording to the maker recording area is paired with said information of the premastered area to determine any differences, such that a number of bits related to said drive control information recorded to the maker recording area can be reduced; and performing optical reproducing from the user area by the drive circuit.

10. The optical reproducing method according to claim 9, wherein the drive control information is a record of at least part of respective information on recording sensitivity, reproducing sensitivity, temperature dependency of recording sensitivity, temperature dependency of reproducing sensitivity, linear speed dependency of recording sensitivity, linear speed dependency of reproducing sensitivity, recording magnetic field sensitivity, reproducing magnetic field sensitivity, an optimum resolution, optimum asymmetry, a change in sensitivity caused by repetitive recording, and a change in sensitivity caused by repetitive reproducing.

11. The optical recording method according to claim 9, further comprising:

judging whether or not information is erroneous based on a required number of drive control information written in the plurality of portions; and wherein the optical recording step of performing an optical recording on the user area of the optical recording medium is based on the drive control information from which erroneous information is eliminated based on the judgement.

12. An optical reproducing method for an optical recording medium having a writable recording layer on a substrate and having a maker recording area and a user recording area formed on the recording layer, wherein individual drive control information of the optical recording medium is recorded in the maker recording area, the optical reproducing method comprising:

controlling a drive circuit on the basis of the drive control information, and performing optical reproducing from the user area by the drive circuit;

wherein the same drive control information is written in a plurality of portions of the maker recording area, and further comprising:

judging whether or not information is erroneous based on a required number of the drive control information written in the plurality of portions, and wherein the optical reproducing step of performing an optical reproducing from the user area of the optical recording medium is based on the drive control information from which erroneous information is eliminated based on the judgement.

13. An optical recording/reproducing device, comprising:

an optical recording medium having, on a substrate, a premastered recording area on which a premastered signal is written by a pattern obtained by molding when the substrate is molded and having a writable recording layer on the substrate, a maker recording area in which a maker recording signal is recorded and a user recording area being formed on the recording layer, wherein individual drive control information of the optical recording medium is recorded in the maker recording area, and wherein said drive control information for recording to the maker recording area is paired with information of the premastered area to determine any differences, such that a number of bits related to said drive control information recorded to the maker recording area can be reduced, the optical recording/reproducing device further comprising:

a laser, an automatic power control circuit of the laser, an emission power monitor for the laser, a premastered signal detection unit for detecting a premastered signal in the premastered area, a maker signal detection unit for detecting a maker recording signal of the maker recording area, and a control circuit which outputs a control signal corrected with respect to a standard value on the basis of the premastered signal and the maker recording signal, the automatic power control circuit automatically controlling the emission power of the laser by the control signal and a monitor signal obtained by the emission power monitor of the laser.

14. The optical recording/reproducing device according to claim 13, wherein the drive control information is at least part of respective information on recording sensitivity, reproducing sensitivity, temperature dependency of recording sensitivity, temperature dependency of reproducing sensitivity, linear speed dependency of recording sensitivity, linear speed dependency of reproducing sensitivity, recording magnetic field sensitivity, reproducing magnetic field sensitivity, an optimum resolution, optimum asymmetry, a change in sensitivity caused by repetitive recording, and a change in sensitivity caused by repetitive reproducing.

15. The optical recording/reproducing device according to claim 13, further comprising a temperature sensor, wherein the control circuit outputs the control signal corrected based on temperature information from the temperature sensor.

16. The optical recording method according to claim 13, wherein said individual drive control information is recorded in a plurality of different portions in the maker recording area, and said same drive control information in said plurality of different portions is read to determine whether said drive control information includes erroneous information, and when said drive control information includes erroneous information, said information written in said premastered area is employed.

17. The optical recording/reproducing device for an optical recording medium having, on a substrate, a premastered recording area on which a premastered signal is written by a pattern obtained by molding when the substrate is molded and having a writable recording layer on the substrate, a maker recording area in which a maker recording signal is recorded and a user recording area being formed on the recording layer, wherein individual drive control information of the optical recording medium is recorded in the maker recording area, the optical recording/reproducing device comprising:

a laser, an automatic power control circuit of the laser, an emission power monitor for the laser, a premastered signal detection unit for detecting a premastered signal in the premastered area, a maker signal detection unit for detecting a maker recording signal of the maker recording area, and a control circuit which outputs a control signal corrected with respect to a standard value on the basis of the premastered signal and the maker recording signal, the automatic power control circuit automatically controlling the emission power of the laser by the control signal and a monitor signal obtained by the emission power monitor of the laser;

wherein the same drive control information is written in a plurality of portions of the maker recording area, the control circuit judging whether or not information is erroneous based on a required number of the drive control information written in the plurality of portions as well as performing an optical reproducing from the user area of the optical recording medium based on the drive control information from which erroneous information is eliminated based on the judgement.

* * * * *